United States Patent
Li et al.

(10) Patent No.: US 8,400,131 B2
(45) Date of Patent: Mar. 19, 2013

(54) VOLTAGE CONVERTER AND LED DRIVER CIRCUITS WITH PROGRESSIVE BOOST, SKIP, AND LINEAR MODE OPERATION

(75) Inventors: Hongxing Li, Tokyo (JP); Tsutomu Wakimoto, Tokyo (JP)

(73) Assignee: Analog Devices, Inc., Norwood, MA (US)

( * ) Notice: Subject to any disclaimer, the term of this patent is extended or adjusted under 35 U.S.C. 154(b) by 375 days.

(21) Appl. No.: 12/720,494

(22) Filed: Mar. 9, 2010

(65) Prior Publication Data

US 2011/0221412 A1    Sep. 15, 2011

(51) Int. Cl.
G05F 1/00    (2006.01)
G05F 5/00    (2006.01)

(52) U.S. Cl. .................. 323/284; 323/280; 323/300

(58) Field of Classification Search .......... 323/280, 323/282–287, 300
See application file for complete search history.

(56) References Cited

U.S. PATENT DOCUMENTS

| | | | |
|---|---|---|---|
| 5,367,247 A * | 11/1994 | Blocher et al. ............. | 323/222 |
| 7,265,504 B2 | 9/2007 | Grant | |
| 7,688,009 B2 * | 3/2010 | Bayadroun ................. | 315/360 |
| 8,169,159 B2 * | 5/2012 | Lu et al. ...................... | 315/307 |
| 2006/0145670 A1 * | 7/2006 | Zhou et al. .................. | 323/222 |
| 2007/0091036 A1 * | 4/2007 | Han et al. .................... | 345/82 |
| 2009/0273290 A1 * | 11/2009 | Ziegenfuss ................. | 315/193 |

* cited by examiner

*Primary Examiner* — Adolf Berhane
*Assistant Examiner* — Gary Nash
(74) *Attorney, Agent, or Firm* — Kenyon & Kenyon LLP

(57) ABSTRACT

A voltage converter circuit can include a boost converter having a switching transistor and configured to receive an input voltage, produce an output voltage and selectively operate in one of a boost mode, a skip mode and a linear mode. In the boost and skip modes, the boost converter can switch on and off the switching transistor at a switching frequency to produce an output voltage at magnitudes greater than input voltage magnitudes. In the linear mode, the boost converter can turn off the switching transistor at all times to pass the input voltage unboosted to produce an output voltage at magnitudes less than input voltage magnitudes. The boost converter can be configured to operate in the boost mode for input voltage magnitudes less than a first predetermined input voltage magnitude, in the skip mode for input voltage magnitudes between the first predetermined magnitude and a second predetermined input voltage magnitude greater than the first predetermined input voltage magnitude, and in the linear mode for input voltage magnitudes greater than the second predetermined input voltage magnitude.

18 Claims, 7 Drawing Sheets

VOLTAGE CONVERTER AND LED DRIVER CIRCUITS WITH PROGRESSIVE BOOST, SKIP, AND LINEAR MODE OPERATION

BACKGROUND INFORMATION

Voltage regulators can be used in applications, including LED driver circuits, to generate and supply relatively constant predetermined output voltages in response to varying input voltages. FIG. 1 depicts a buck-boost switching regulator 20 configured to generate and deliver an output voltage VOutx from an input voltage VIn. In response to gate control signals VGatex, VGatey delivered to switching transistors Mx, My, energy is selectively stored and released in and between an inductor Lx and a capacitor Cx utilizing conduction pathways variously formed by the switching transistors Mx, My and a pair of diodes Dx, Dy. The buck-boost regulator 20 can be configured to generate output voltage magnitudes that are either smaller or larger than input voltage magnitudes. However, one disadvantage of this type of buck-boost converter is that the control circuitry (not shown) necessary to generate suitable gate control signals VGatex, VGatey can be undesirably complex and potentially expensive to design and fabricate.

FIG. 2 depicts a linear regulator configuration 24 commonly referred to as a low-dropout (LDO) regulator 24. A negative feedback loop formed by an amplifier Ax and an output transistor Mz can generate and deliver an output voltage Vouty, having a predetermined value as a function of a reference voltage Vrefx, into a capacitor Cy from the input voltage VIn. The LDO regulator 24 can generally only deliver output voltage magnitudes less than received input voltage magnitudes. The depicted LDO regulator also has additional disadvantages, beyond being unable to boost voltages, including being relatively power inefficient, due to power being dissipated in proportion to the voltage drop between the input and output voltages Vin, Vouty and an associated current through the output transistor Mz. This power inefficiency becomes an increasing concern with increasing voltage magnitude differences between the input and output voltages VIn, Vouty.

Thus, there exists a need for voltage converters, including to drive LEDs, that are capable of selective voltage boosting, having reduced complexity and cost, and being power efficient.

BRIEF DESCRIPTION OF THE DRAWINGS

So that features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

A voltage converter circuit can include a boost converter having a switching transistor and configured to receive an input voltage, produce an output voltage and selectively operate in one of a boost mode, a skip mode and a linear mode. In the boost and skip modes, the boost converter can operate as a switching regulator to switch on and off the switching transistor at a switching frequency to produce an output voltage at magnitudes greater than input voltage magnitudes. In the linear mode, the boost converter can turn off the switching transistor at all times to pass the input voltage unboosted to produce an output voltage at magnitudes less than input voltage magnitudes, and utilize a regulated current source to limit voltages passed to a load such as an LED. The boost converter can be configured to operate in the boost mode for input voltage magnitudes less than a first predetermined input voltage magnitude, in the skip mode for input voltage magnitudes between the first predetermined magnitude and a second predetermined input voltage magnitude greater than the first predetermined input voltage magnitude, and in the linear mode for input voltage magnitudes greater than the second predetermined input voltage magnitude.

The voltage converter circuit can thus be used as both a switching regulator and a linear regulator, capable of producing boosted output voltages at a relatively high efficiency as a switching regulator for low input voltage magnitudes, and unboosted output voltages at a relatively high efficiency as a linear regulator for high input voltage magnitudes, without necessitating the undesirable complexity of a buck-boost switching regulator and avoiding inefficient linear operation at high input voltage magnitudes. The voltage converter circuit can thus provide an efficient realization of both boosting and non-boosting voltage regulation.

Figure 1:
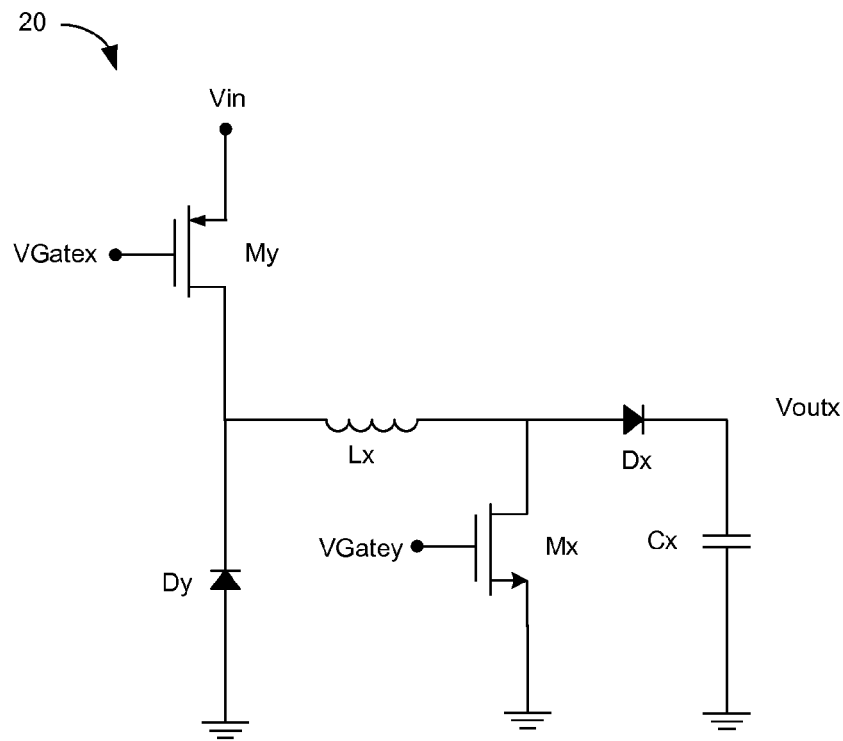
FIG. 1 is a circuit schematic depicting an embodiment of buck-boost voltage regulator.
Figure 2:
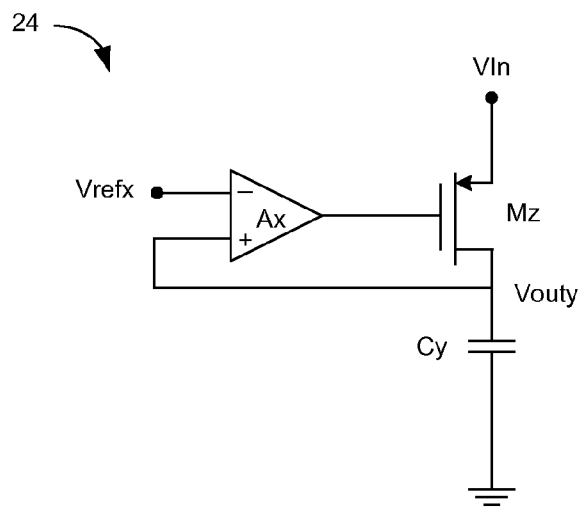
FIG. 2 is a circuit schematic depicting an embodiment of a low-dropout linear voltage regulator.
Figure 3:
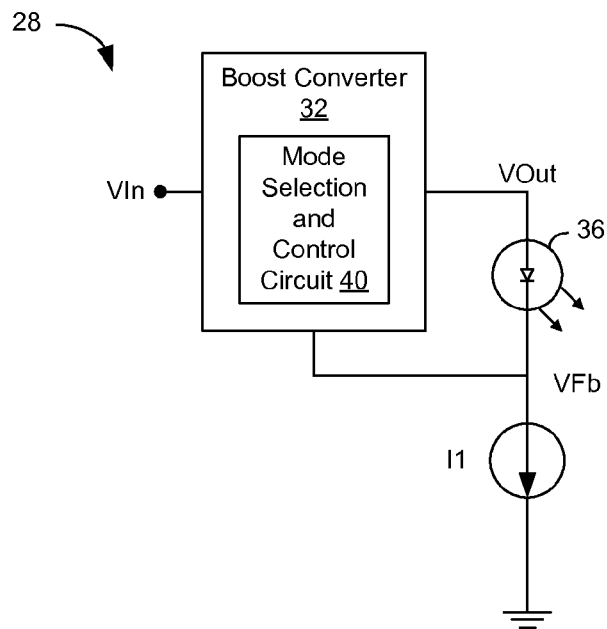
FIG. 3 is a circuit schematic depicting an embodiment of a voltage converter that can be used as an LED driver.

FIG. 3 is a circuit schematic depicting an embodiment of a voltage converter circuit 28 configured for use as an LED driver. The voltage converter circuit 28 can include a boost converter 32, a regulated current source I1, and an LED 36. The voltage converter circuit can also be used in other voltage-conversion applications by replacing the LED with other loads, such as resistors or other impedances, or connecting output and feedback terminals of the voltage converter to inputs of other circuits. The boost converter 32 can be configured to receive an input voltage VIn at an input terminal, generate a regulated output voltage VOut at an output terminal, and receive a feedback voltage VFb, based on the output voltage VOut, at a feedback terminal. The boost converter 32 can include a mode-selection-and-control circuit 40 configured to select and control the boost converter to operate at any one time in one of three modes, including a boost mode, a skip mode and a linear mode. The voltage converter circuit 28, as used as an LED driver, can include the LED 36 connected between the output and feedback terminals. The voltage converter circuit 28 can include the regulated current source I1, which can be configured to draw a regulated current from the LED 36, connected to the LED 36 and feedback terminal.

Figure 4:
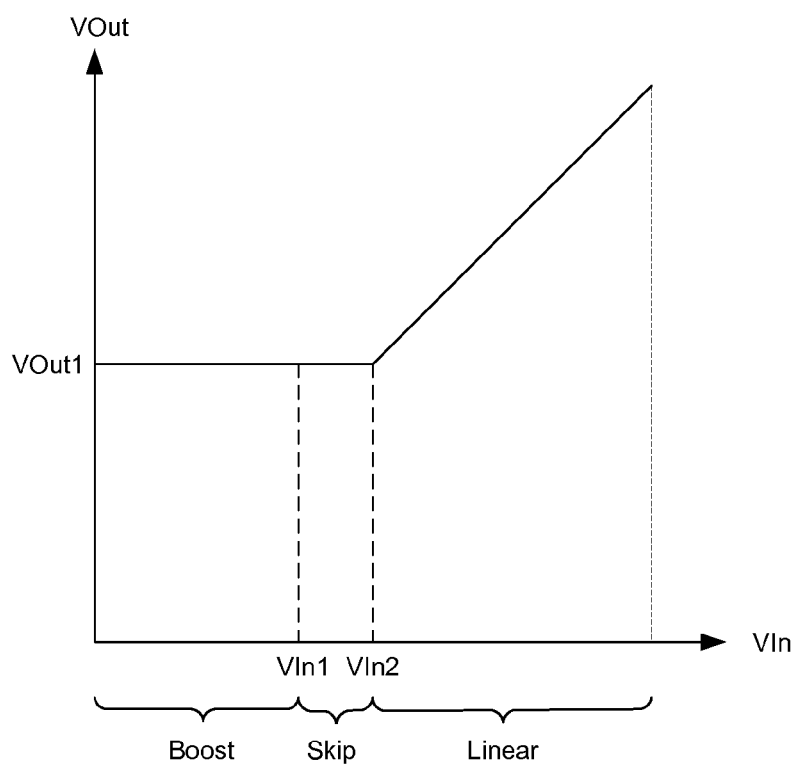
FIG. 4 is a graph depicting an embodiment of an output voltage, and its correspondence to boost, skip and linear operating modes, of the voltage converter as a function of an input voltage.

FIG. 4 is a graph depicting a plot of an embodiment of a variation of the output voltage VOut as a function of the input voltage VIn for the voltage converter circuit 28. In FIG. 4, the input voltage VIn is depicted on the x-axis and the output voltage VOut is depicted on the y-axis. For input voltage magnitudes less than a first predetermined input voltage magnitude VIn1, the voltage converter circuit can generate a first predetermined output voltage magnitude VOut1. In this input voltage magnitude region, the voltage converter circuit 28 can operate in the boost mode, and provide voltage boosting to produce output voltage magnitudes greater than received input voltage magnitudes. For input voltage magnitudes greater than the first predetermined input voltage magnitude VIn1 but less than a second predetermined input voltage magnitude VIn2 greater than the first predetermined input voltage magnitude VIn1, the voltage converter circuit 28 can also generate the first predetermined output voltage magnitude VOut1, but in this input voltage magnitude region operate in the skip mode, although still providing voltage boosting to produce output voltage magnitudes greater than received input voltage magnitudes. For input voltage magnitudes greater than the second predetermined input voltage magnitude VIn2, the voltage converter circuit 28 can generate output voltage magnitudes that substantially track the received input voltage magnitudes. In this input voltage magnitude region, the voltage converter circuit 28 can operate in the linear mode, and instead of providing voltage boosting, essentially allow the input voltage VIn to pass through the voltage converter substantially unaltered to produce the output voltage magnitudes that substantially track the received input voltage magnitudes. In the linear mode, the regulated current source I1 can be used to limit a voltage across a load such as the LED 36.

In the boost and skip modes, the converter circuit 28 can be configured so that the boost converter 32 operates as a switching regulator, whereas in the linear mode, the converter circuit 28 can be configured so that the boost converter can operate to shut down or bypass switching elements, leaving the remaining elements of the converter circuit 28 to operate in a linear, i.e., non-switching, circuit mode. That is, the boost converter 28 can include a switching transistor M1, and in the boost and skip modes the boost converter 28 can generate and deliver a pulse-width-modulated (PWM) gate control signal to a gate of the switching transistor M1, whereas in the linear mode the boost converter 28 can deliver a non-PWM gate control signal to the gate to turn off the switching transistor M1. In the boost mode the boost converter 28 can generate and deliver pulses of the PWM control signal to the gate of the switching transistor M1 during each cycle of a switching clock signal VClock1, and in skip mode the boost converter 28 can generate and deliver pulses of the PWM gate control signal to the gate of the switching transistor M1 during less than all cycles of the switching clock signal VClock1.

Figure 5:
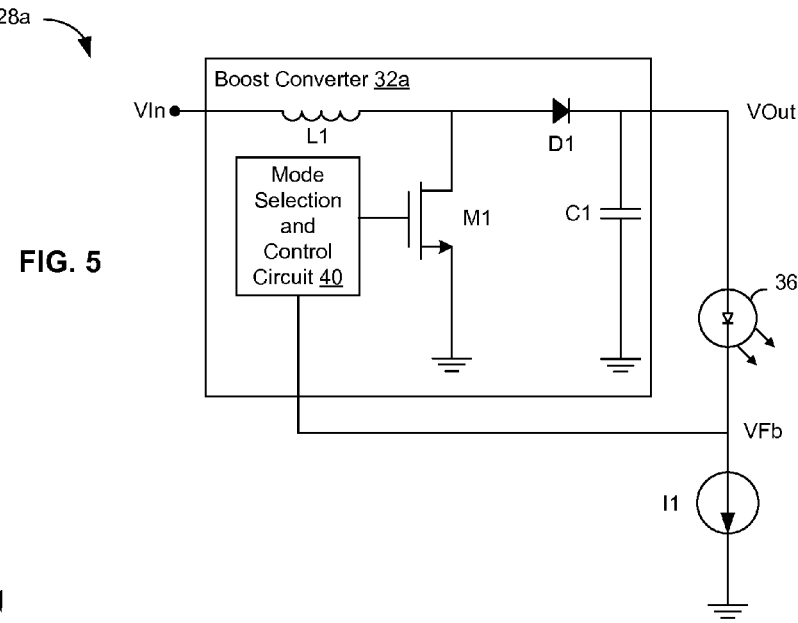
FIG. 5 is a circuit schematic depicting another embodiment of the voltage converter.

FIG. 5 is a circuit schematic depicting another embodiment 28a of the voltage converter 28, including a more detailed view of an embodiment 32a of the boost converter 32. The boost converter 32 can include an inductor L1, the switching transistor M1, the mode-selection-and-control circuit 40, a diode D1, and a capacitor C1. The inductor L1 can be configured to have one terminal connected to the input terminal of the boost converter 32, to receive the input voltage VIn, the diode D1 can be connected between the inductor L1 and the output terminal of the boost converter 32, and the capacitor C1 can be connected to the output terminal of the boost converter 32. The switching transistor M1 can have a gate connected to receive either the PWM gate control signal or the non-switching gate control signal from the mode-selection-and-control circuit 40. In the boost and skip modes, the switching transistor M1 can be switched according to the PWM gate control signal to selectively transfer energy between the inductor L1 and the capacitor C1, according to different conduction paths formed by turning on and off the switched transistor M1. For example, when the switching transistor M1 is switched on, current can flow through the inductor L1, through the conduction path between the drain and source of the switching transistor M1, to ground, to store energy in the inductor L1. When the switching transistor M1 is switched off, current can flow through the inductor L1, through the diode D1, and to the capacitor C1 and the output terminal, and the energy stored in the inductor L1 can be transferred to the capacitor C1. During the boost and skip modes, repeated energy transfers between the inductor L1 and the capacitor C1 by the switching of the switching transistor M1 between these alternate conduction paths can generate an output voltage VOut that is boosted, i.e., had greater magnitude, in comparison to the input voltage VIn. The mode-selection-and-control circuit 40 can be configured to generate and deliver suitable PWM gate control signals to the gate of the switching transistor M1 during the boost and skip modes.

During the linear mode, the mode-selection-and-control circuit 40 can be configured to generate and deliver a non-switching gate control signal to the gate of the switching transistor M1 to turn off the switching transistor M1. In this mode, current can flow from the input terminal, through the inductor L1 and diode D1, to the capacitor C1 and output terminal. In the linear mode, the switching transistor M1 does not switch, and thus no repeated energy transfers between the inductor L1 and the capacitor C1, and thus no voltage boosting, occur, and the output voltage VOut substantially tracks the input voltage VIn, with small differences due to any voltage changes across the inductor L1, either due to a non-ideal resistance of the inductor L1 or potential filter-like effects of the inductor L1 as a function of the frequency content of the input voltage VIn, and a voltage drop across the diode D1. The voltage delivered across the LED 36 can be limited in the linear mode by drawing the regulated current by the regulated current source I1 from the LED 36.

Figure 6:
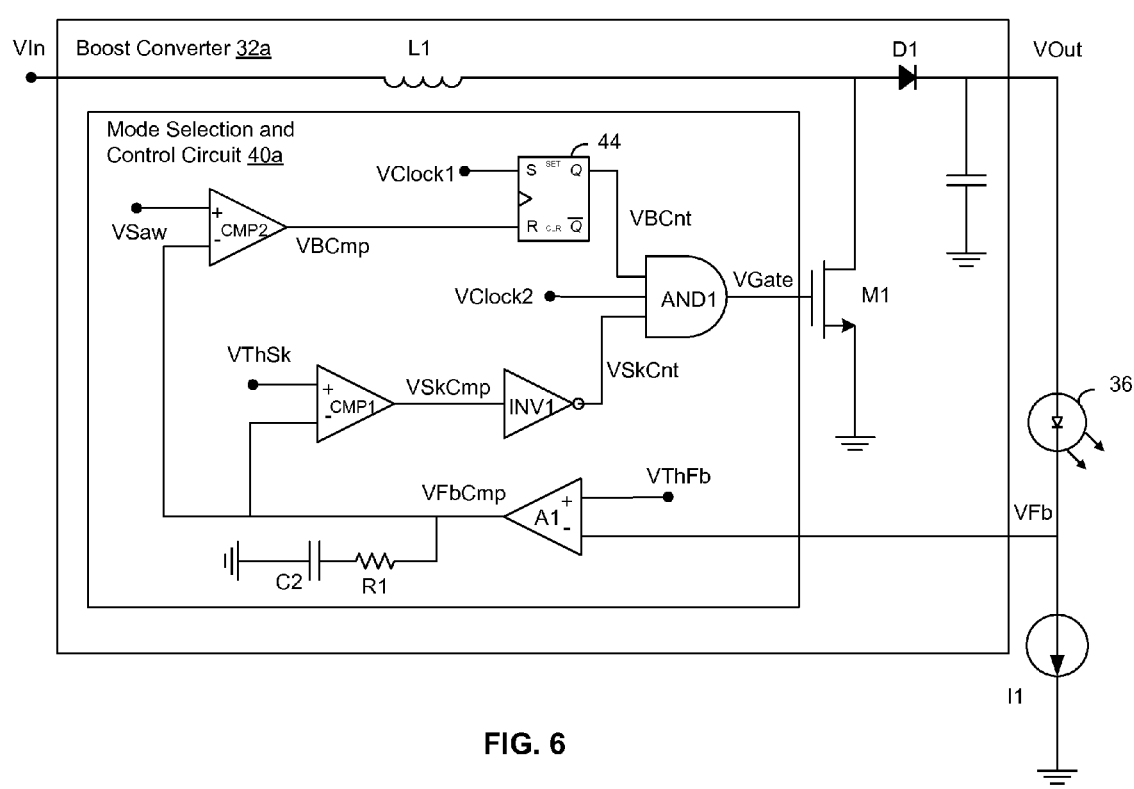
FIG. 6 is a circuit schematic depicting another embodiment of the voltage converter.

FIG. 6 is a circuit schematic depicting another embodiment 28b of the voltage converter circuit 28, including a more detailed view of an embodiment 40a of the mode-selection-and-control circuit 40. The mode-selection and control circuit 40 can be configured to receive the feedback voltage VFb at the feedback terminal of the voltage converter 28. In embodiments of the voltage converter 28 having the LED 36 connected across the output terminal and the feedback terminal, the feedback voltage VFb can substantially track the output voltage VOut, although reflecting a voltage drop across the LED 36. The mode-selection-and-control circuit 40 can also be configured to receive or internally generate other signals and reference voltages for use in generating the gate control signal VGate (i.e., in the form of either the PWM switching gate control signal or the non-switching gate control signal)

for the switching transistor M1. These other signals and reference voltages can include a sawtooth signal VSaw, the first switching clock signal VClock1, a second switching clock signal VClock2, a feedback threshold voltage VThFb, and a skip threshold voltage VThSk.

In FIG. 6, a feedback amplifier A1 can receive the feedback voltage VFb and the feedback threshold voltage VThFb at negative and positive differential input terminals, respectively, compare the feedback voltage VFb to the feedback threshold voltage VThFb, and generate a feedback comparison signal VFbCmp across an impedance as a function of the voltage difference between the feedback voltage VFb and the feedback threshold voltage VThFb. The impedance can include a resistor R1 and a capacitor C2. A skip mode comparator CMP1 can receive the feedback comparison signal VFbCmp and the skip threshold voltage VThSk at its negative and positive input terminals, respectively, and generate a skip comparison signal VSkCmp, an inversion of which can be generated by an inverter as a skip mode control signal VSkCnt. A boost mode comparator CMP2 can receive the feedback comparison signal VFbCmp and the sawtooth signal VSaw at its negative and positive input terminals, respectively, and generate a boost comparison signal VBCmp. An SR latch 44 can receive the boost comparison signal VBCmp at its reset input R and the first clock signal VClock1 at its set input S. A multi-input AND gate AND1, e.g., a three-input AND gate AND1, can receive the skip control signal VSkCnt, the output Q of the SR latch 44, i.e., a boost control signal VBCnt, and a second clock signal VClock2 at its inputs, and deliver the PWM or non-switching gate control signal VGate at its output to the switching transistor M1.

Figure 7:
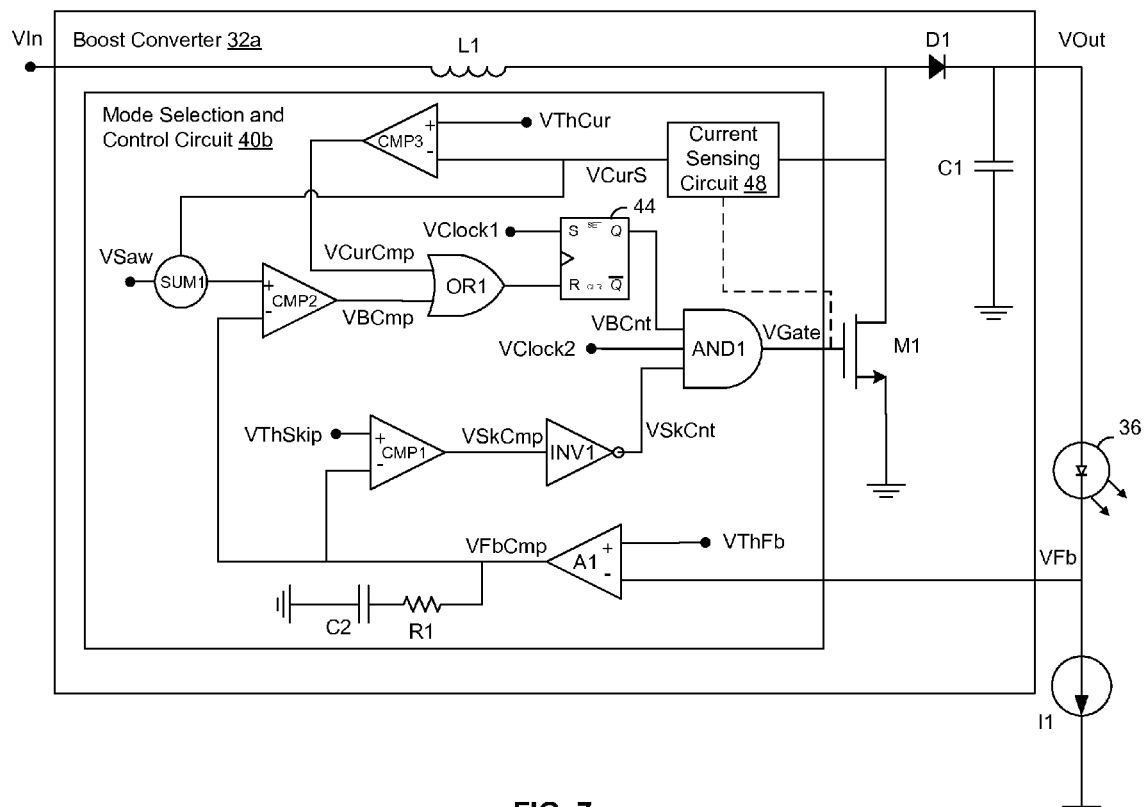
FIG. 7 is a circuit schematic depicting another embodiment of the voltage converter.

The mode-selection-and-control circuit 40a of FIG. 6 can include a voltage-mode feedback control scheme to control the generation and delivery of the PWM or non-switching gate control signal VGate. However, in other embodiments, a voltage-mode feedback control scheme can be combined with a current-mode feedback control scheme to generate and deliver the gate control signal VGate. FIG. 7 is a circuit schematic depicting another embodiment of the voltage converter circuit 28c, including a detailed view of another mode-selection-and-control circuit 40b that includes a current-mode feedback control portion. In addition to the voltage-mode feedback components of FIG. 6, FIG. 7 may include a current sensing circuit 48 configured to sense the current in the switching transistor M1 and deliver a current sense signal VCurS to a negative input terminal of a current limit comparator CMP3 and to a summator SUM1. The current limit comparator CMP3 can also receive a current threshold voltage VThCur at its positive input terminal and deliver a current comparison signal VCurCmp to an input of a two-input OR gate OR1. The OR gate OR1 can be connected between the boost mode comparator CMP2 and the SR latch 44, the other input of the OR gate OR1 receiving the output VBCmp of the boost mode comparator CMP2 and delivering its output to the reset input R of the SR latch 44. The summator SUM1 can receive the sawtooth signal VSaw at a first input and the current sense signal VCurS at a second input and deliver a summation of the sawtooth signal VSaw and the current sense signal VCurS to the positive input terminal of the boost mode comparator CMP2.

The voltage-mode feedback operation of both FIGS. 6 and 7 is substantially the same, and can be described simultaneously. In more detail, one mode of operation of the mode-selection-and-control circuit 40 of FIGS. 6 and 7 can proceed as follows. The feedback voltage VFb can track the output voltage VOut, the difference between the feedback and output voltages VFb, VOut primarily being the diode voltage drop across the LED 36. Thus, the feedback voltage VFb can represent a measure of the output voltage VOut delivered to the mode-selection-and-control circuit 40. This measure of the output voltage VOut, i.e., the feedback voltage VFb, can be compared to a feedback threshold voltage VThFb, the result of the comparison being reflected as the feedback comparison signal VFbCmp developed across the load impedance. This comparison can set a level of output voltage VOut at which the mode-selection-and-control circuit 40 can implement a transition between the linear mode and the PWM modes including the boost and skip modes. That is, for feedback voltages VFb above the feedback threshold voltage VThFb, the generated feedback comparison voltage VFbCmp can fall below a level that activates either the boost mode comparator CMP2 or the skip mode comparator CMP1, i.e., the feedback comparison voltage VFbCmp so generated can have values less than values of both the sawtooth signal VSaw and the skip threshold voltage VThSk. Also, because both the skip threshold voltage VThSk and sawtooth signal VSaw can have values set to have predetermined relationships to the first and second predetermined values of the input voltage VIn, the transition between the linear, boost and skip modes as a function of the input voltage VIn can be implemented in part by selecting this relationship between the various reference voltages and signals utilized by the mode-selection-and-control circuit 40, including the skip threshold voltage VThSk and sawtooth signal VSaw.

Figure 8:
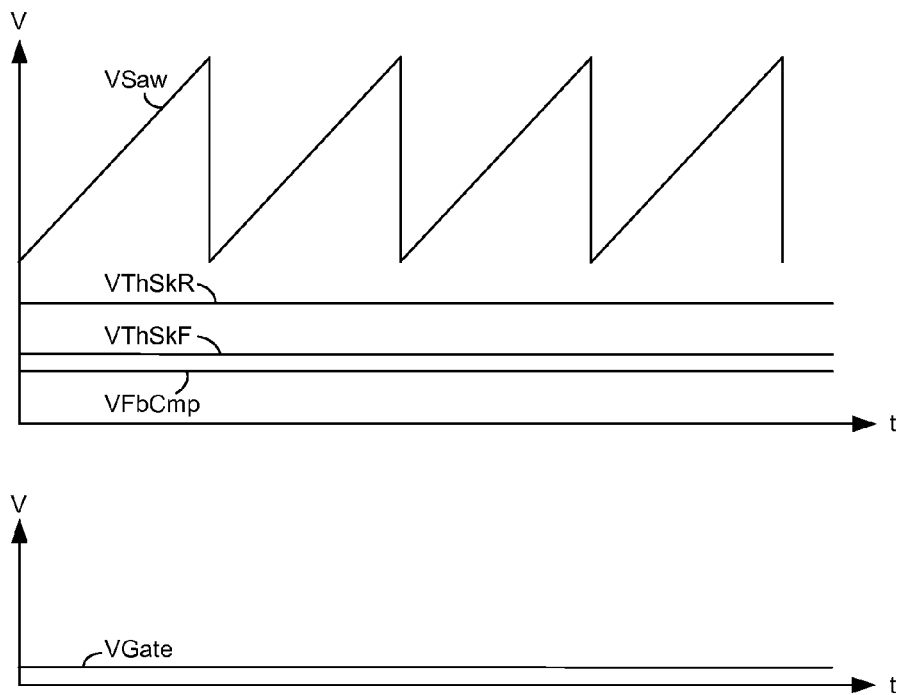
FIG. 8 is a graph depicting one embodiment of control signals generated and used by the voltage converter in the linear mode.

FIG. 8 depicts voltage waveforms associated with one embodiment of operation of the mode-selection-and-control circuit 40 in the linear mode. In FIG. 8, the comparison of the feedback voltage VFb to the feedback threshold voltage VThFb has generated a feedback comparison voltage VFbCmp having a value that falls below the values of both the sawtooth waveform VSaw and the skip threshold voltage VThSk. Because the feedback comparison voltage VFbCmp falls below the sawtooth signal VSaw and the skip threshold voltage VThSk, the boost comparator CMP2 and the skip comparator CMP1 are both activated, i.e., outputting boost comparison and skip comparison signals VBCmp, VSkCmp at logic high levels, and the skip control signal VSkCnt at a logic low level. The logic low skip control signal VSkCnt fed to the AND gate AND1 thus keeps the output of the AND gate, i.e., the gate control voltage VGate, at a logic low level, turning off the switching transistor M1 at all times during the linear mode.

Note that the skip comparator CMP1 can implement a hysteresis comparison, in which a falling voltage comparison threshold is different than a rising voltage comparison threshold. Thus, in FIG. 8, both a rising skip threshold voltage VThSkR and a falling skip threshold voltage VThSkF are shown. The rising skip threshold voltage VThSkR and falling skip threshold voltage VThSkF can optionally be functions of a single skip threshold voltage VThSk fed to the skip comparator CMP1, e.g., implemented internally by the skip comparator CMP1 in response to the single skip threshold voltage VThSk. Alternatively, both the rising skip threshold voltage VThSkR and falling skip threshold voltage VThSkF can be delivered to the skip comparator CMP1.

Returning to FIGS. 6 and 7, the feedback comparison voltage VFbCmp can be delivered to both the skip comparator CMP1 and the boost comparator CMP2. The comparisons implemented by these comparators can enable aspects of the skip and boost modes. If the comparison implemented by the feedback amplifier A1 generates a feedback comparison voltage VFbCmp having a value greater than the skip threshold voltage VThSk and within the voltage range of the sawtooth signal VSaw, then the mode-selection-and-control circuit 40 can be configured to enter the boost mode.

Figure 9:
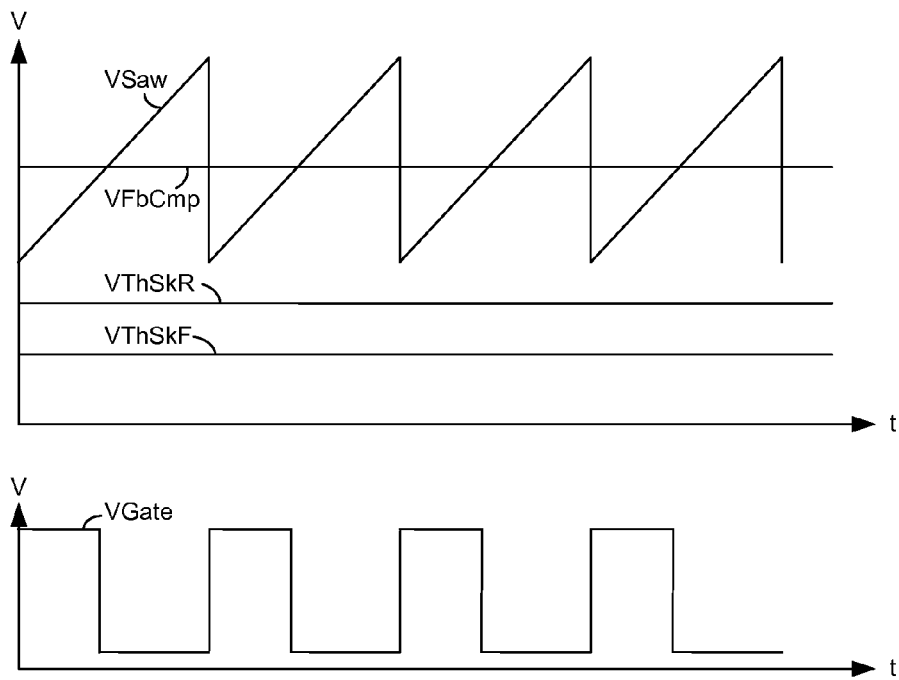
FIG. 9 is a graph depicting one embodiment of control signals generated and used by the voltage converter in the boost mode.

FIG. 9 depicts voltage waveforms associated with one embodiment of operation of the mode-selection-and-control circuit 40 in the boost mode. The skip threshold voltages VThSk, including the rising skip threshold voltage VThSkR and the falling skip threshold voltage VThSkF, can be lower than the voltage levels of the sawtooth signal VSaw. In FIG. 9, the comparison implemented by the feedback amplifier A1 has generated a feedback comparison voltage VFbCmp having a level greater than the skip threshold voltage VThSk and falling within the voltage range of the sawtooth signal VSaw. In such a scenario, the skip comparator CMP1 is deactivated, outputting a logic low skip comparison signal VSkCmp and producing a logic high skip control signal VSkCnt fed to the AND gate AND1. The depicted feedback comparison voltage VFbCmp falls within the voltage range of the sawtooth signal VSaw, and thus the boost comparator CMP2 is alternately activated and deactivated as the sawtooth signal VSaw rises above and falls below the feedback comparison voltage VFbCmp, respectively, producing a boost comparison signal VBCmp having the form of a PWM signal having a duty cycle controlled by the relative voltage level of the feedback comparison signal VFbCmp in comparison to the voltage range of the sawtooth signal VSaw. The PWM boost comparison signal VBCmp can be fed either directly to the SR latch 44, as in the embodiment 40*a* of FIG. 6, or to the OR gate OR1, as in the embodiment 40*b* of FIG. 7, where it is combined with a current-mode-feedback current comparison signal VCurCmp and a related signal then passed to the SR latch 44. In both cases, either the boost comparison signal VBCmp or a modified boost comparison signal, i.e., the output of the OR gate OR1, can be fed to the reset input R of the SR latch 44, while a first clock signal VClock1 can be fed to the set input S of the SR latch 44, the result being an output Q of the SR latch delivering a boost control signal VBCnt having a falling edge controlled by the boost comparison signal VBCmp or modified boost comparison signal and a rising edge controlled by the first clock signal VClock1. The first clock signal VClock1 can be a square wave alternating from logic low to logic high at according to a switching frequency and a first predetermined duty cycle. The first duty cycle can be used to set the minimum on-time of the switching transistor M1 during the boost and skip modes.

The second clock signal VClock2 can be a square wave alternating from logic low to logic high at according to the switching frequency and a second predetermined duty cycle. The second duty cycle can be greater than first duty cycle, and be used to set the maximum on-time of the switching transistor M1 during the boost mode. The second clock signal VClock2 can be fed to the AND gate AND1 along with the boost control signal VBCnt and the skip control signal VSkCnt. Together, these three inputs can control the nature of the gate control signal VGate output by the AND gate AND1 and delivered to the gate of the switching transistor M1. In the boost mode, as exemplarily depicted in FIG. 9, the result of the ANDing of the second clock signal VClock2, the boost control signal VBCnt and the skip control signal VSkCnt produces a PWM gate control signal VGate having a duty cycle resulting from the relative level of the feedback comparison voltage VFbCmp in relation to the voltage range of the sawtooth signal VSaw. In boost mode, the mode-control-and-selection circuit 40 can deliver such a PWM gate control signal VGate to enable voltage boosting to produce an output voltage VOut having voltage levels greater than voltage levels of the input voltage VIn.

Figure 10:
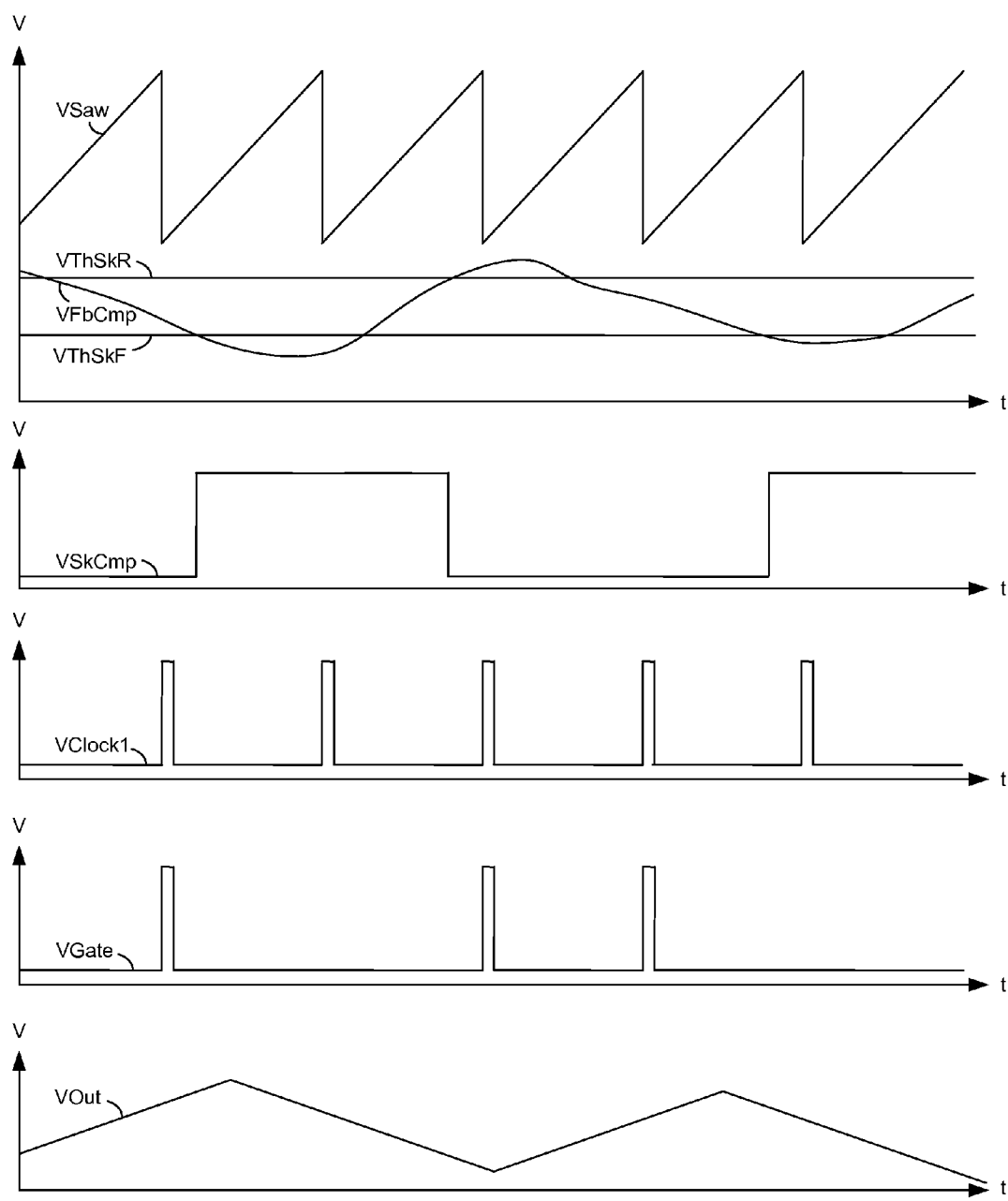
FIG. 10 is a graph depicting one embodiment of control signals generated and used by the voltage converter in the skip mode.

FIG. 10 depicts voltage waveforms associated with one embodiment of operation of the mode-selection-and-control circuit 40 in the skip mode. In the skip mode, the feedback comparison signal VFbCmp can have a voltage level below the voltage range of the sawtooth signal VSaw, but intermittently crossing the skip threshold voltages VThSk including the rising skip threshold voltage VThSkR and the falling skip threshold voltage VThSkF. For a rising feedback comparison voltage VFbCmp having a level still below the rising skip threshold voltage VThSkR, the skip comparator CMP1 can be activated and produce a logic high skip comparison signal VSkCmp and a corresponding logic low skip control signal VSkCnt. Similar to in linear mode, a logic low skip control signal VSkCnt fed to the AND gate AND1 can produce a logic low gate control signal VGate. For a rising feedback comparison voltage VFbCmp having a level that eventually rises above the rising skip threshold voltage VThSkR, the skip comparator CMP1 can be deactivated and produce a logic low skip comparison signal VSkCmp and a corresponding logic high skip control signal VSkCnt. Similar to in boost mode, a logic high skip control signal VSkCnt fed to the AND gate AND1 can enable generation of a PWM gate control signal VGate. In the case of a feedback comparison signal VFbCmp that has risen above the rising skip threshold voltage VThSkR, but has not yet risen to within the voltage range of the sawtooth signal VSaw, the logic high skip control signal VSkCnt is ANDed with the boost control signal VBCnt and the second clock signal VClock2. The boost control signal VBCnt, i.e., delivered by the output of the SR latch 44, can take the form of the first clock signal VClock1 because the feedback comparison signal VFbCmp has not yet risen to within the voltage range of the sawtooth signal VSaw. The logic high skip control signal VSkCnt can thus be ANDed with the boost control signal VBCnt, having the form of the first clock signal VClock1 having the switching frequency and first duty cycle, and the second clock signal VClock2, having the switching frequency and second duty cycle. The result of such an ANDing can be a PWM gate control signal VGate having the minimum duty cycle, i.e., the first duty cycle. If the feedback comparison voltage VFbCmp were to rise further, to within the voltage range of the sawtooth signal VSaw, the mode-selection-and-control circuit 40 can enter into the boost mode and the duty cycle of the resulting PWM gate control signal VGate could begin to increase. If the feedback comparison voltage VFbCmp instead begins to fall, the skip comparator CMP1 can stay deactivated, and produce a logic low skip comparison signal VSkCmp, logic high skip control signal VSkCnt and PWM gate control signal VGate, until it falls below the falling skip threshold voltage VThSkF, at which time the skip comparator CMP1 can be activated, and produce a logic high skip comparison signal VSkCmp, logic low skip control signal VSkCnt and logic low gate control signal VGate, similar again to the linear mode.

Thus, the skip mode can act as an effective way of transitioning between the linear and boost modes for feedback comparison voltages VFbCmp varying in the range of the skip threshold voltages VThSk but still generally below the voltage range of the sawtooth signal VSaw. As depicted in FIG. 10, during the skip mode the mode-selection-and-control circuit 40 can be configured to produce a PWM gate control signal VGate that includes pulses having the minimum duty cycle, i.e., the first duty cycle, at but during less than all cycles of the switching frequency of the first and second clock signals VClock1, VClock2. That is, during the skip mode the PWM gate control signal VGate can include minimum-duty cycle pulses coinciding with a subset of the pulses of the first clock signal VClock1, the subset being less than all the pulses of the first clock signal VClock1 and the subset selection being defined by the skip control signal VSkCnt.

Figure 11:
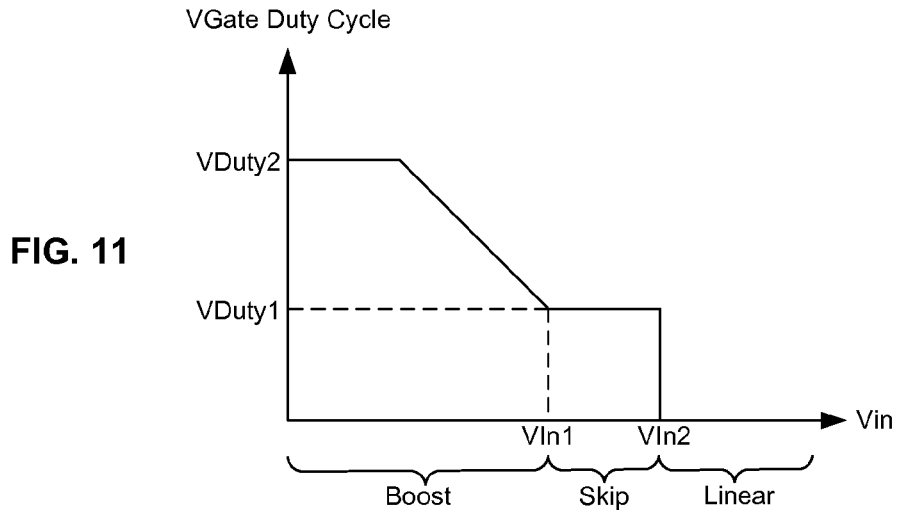
FIG. 11 is a graph depicting an embodiment of a duty cycle of a gate control signal delivered to a switching transistor of the voltage converter, and its correspondence to the boost, skip and linear operating modes, of the voltage converter circuit as a function of input voltage.

FIG. 11 is a graph depicting an embodiment of a duty cycle of the gate control voltage VGate, as a function of input voltage VIn, that can be produced by the mode-selection-and-control circuit 40. For low input voltage values, e.g., those below the first predetermined input voltage value VIn1, the mode-selection-and-control circuit 40 can be configured to operate in the boost mode to produce output voltage values greater than the input voltage values. In boost mode, the mode-selection-and-control circuit 40 can modify the duty cycle of the PWM gate control signal, e.g., selectively increase the duty cycle to enable greater degrees of voltage boost for relatively lower input voltage values, and selectively decrease the duty cycle to enable lesser degrees of voltage boost for relatively higher input voltage values. Ad depicted in FIG. 11, the mode-selection-and-control circuit 40 can be configured to limit the duty cycle variation of the PWM gate control signal VGate to variation between the first duty cycle VDuty1 embodied by the first clock signal VClock1 and the second duty cycle VDuty2 embodied by the second clock signal VClock2. For medium input voltage values, e.g., those above the first predetermined input voltage VIn1 and below the second predetermined input voltage VIn2, the mode-selection-and-control circuit 40 can be configured to operate in the skip mode to produce output voltage values still greater than, but approximately on par with, input voltage values. In skip mode, the mode-selection-and-control circuit 40 can be configured to delivery a PWM gate control signal VGate having the minimum duty cycle, i.e., the first duty cycle VDuty1 embodied by the first clock signal VClock1, although during skip mode the mode-selection-and-control circuit 40 can deliver a minimum-duty-cycle PWM gate control signal VGate having pulses corresponding only to a subset of the first clock signal pulses. For large input voltage values, e.g., those above the second predetermined input voltage VIn2, the mode-selection-and-control circuit 40 can be configured to operate in the linear mode to produce output voltage values less than input voltage values. In the linear mode, the mode-selection-and-control circuit 40 can deliver a non-switching, non-PWM gate control signal VGate to turn off the switching transistor M1 at all times during the linear mode.

The FIG. 7 embodiment 40b of the mode-selection-and-control circuit 40 includes further components that can implement current mode feedback control that can operate in parallel with the voltage mode feedback control. Current mode feedback can typically provide feedback control of the output voltage VOut at a different speed, i.e., frequency response, than typically can voltage mode feedback control of the output voltage VOut. For example, current mode feedback control can typically be configured to provide relatively faster feedback control of the output voltage VOut than typically can voltage mode feedback control. In FIG. 7, the current sensing circuit 48 can sense the current flowing in the switching transistor M1 and generate a current sense signal VCurS that can be fed to the summator SUM1. The summator can be configured to generate an adjusted sawtooth signal having the form of the sawtooth signal VSaw but having its mean voltage adjusted up or down according to the value of the current sense signal VCurS. The adjusted sawtooth signal can then be compared to the feedback comparison signal VFbCmp by the boost comparator CMP2, as discussed above, and the mode-selection-and-control circuit 40, as depicted in FIG. 7, can thus vary the duty cycle of the PWM boost compare signal VBCmp, and ultimately the duty cycle of the PWM gate control signal VGate, as a function of the sensed current in the switching transistor M1, implementing current mode feedback control of the output voltage VOut.

The embodiment of FIG. 7 also includes components that can limit the current in the switching transistor M1 to prevent damage to the this transistor M1. The current sensing circuit 48 can be configured to sense the current flowing in the switching transistor M1 and generate a current sense signal VCurS that can be fed to a negative input terminal of a current limit comparator CMP3. The current limit comparator CMP3 can also receive a current limit threshold voltage VThCur at a positive input terminal, and generate a current comparison signal VCurCmp as a function of the difference between the current sense signal VCurS and current limit threshold signal VThCur. The current comparison signal VCurCmp can be fed to the OR gate OR1, along with the boost comparison signal VBCmp, and the output of the OR gate OR1 can be fed to the SR latch 44. In FIG. 7, the current sensing circuit 48 can be configured to produce a rising current sense signal VCurS for a falling switching transistor current, and falling current sense signal VCurS for a rising switching transistor current. Thus, if the current sensing circuit 48 produces a current sense signal VCurS that falls below the current limit threshold voltage VThCur, then the current comparator CMP3 will deactivate, producing a current comparison signal VCurCmp having a logic high value, and necessarily producing an output of the OR gate OR1 also having a logic high value. In this way, the rising current can, once it reaches a predetermined threshold, reset the SR latch 44, thus turning off the switching transistor M1 to limit its current and protect this transistor M1.

Figure 12:
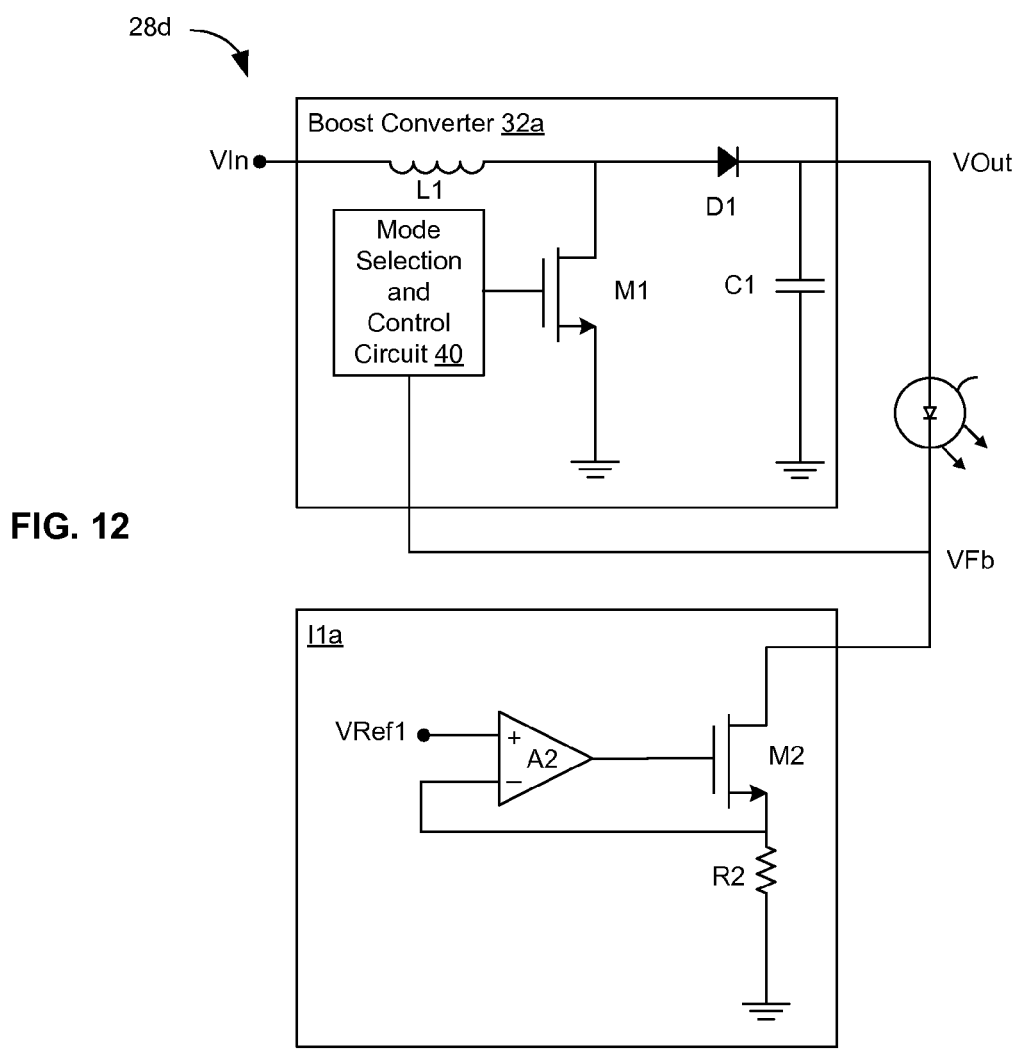
FIG. 12 is a circuit schematic depicting another embodiment of the voltage converter.

FIG. 12 is a circuit schematic depicting another embodiment 28d of the voltage converter circuit 28 showing an embodiment 11a of the regulated current source I1 in more detail. In FIG. 12, the regulated current source I1 can include an amplifier A2 configured to receive a reference voltage VRef1 at a positive input terminal, a feedback voltage across a resistor R2 at a negative input terminal, and connect to a gate of an output transistor M2 at an output terminal, the output transistor M2 having a source connected to the resistor R2 and a drain supplying the regulated current of the regulated current source I1. In operation, the amplifier A2 can be configured to enforce the reference voltage VRef across the resistor R2 through the action of the negative feedback loop including the amplifier A2 and the output transistor M2. This in turn can created a predetermined current flowing through the resistor R2 and substantially the same current flowing from the drain to the source of the output transistor M2, thereby setting the regulated current value of the regulated current source I1 as substantially equal to the reference voltage VRef divided by the resistance value of the resistor R2. The regulated current value of the regulated current source I1 can thus be adjusted by adjusting either the reference voltage VRef or the resistance value of the resistor R2.

Additional embodiments of the voltage converter circuit 28 are possible, and can be the result of variously combining together portions of or entire embodiments of the voltage converter circuit 28 described herein. For example, any feature of any of the embodiments of the voltage converter circuit 28 described herein can optionally be used in any embodiment of the voltage converter circuit 28. Also, the operation of embodiments discussed herein is exemplary. The voltage converter circuit 28 may be operated according to different bias regimes, signal compositions, threshold voltages, etc., and still retain functionality and usefulness. Various logic and other components described herein as operating according to a specific one of a logic low or logic high state can instead be operated according to a reversed polarity, i.e., implement functionality via a logic high state when such is described herein as corresponding to a logic low state, or implement functionality via a logic low state when such is described herein as corresponding to a logic high state.

What is claimed is:

1. A voltage converter circuit, comprising:
    a boost converter having a switching transistor and configured to receive an input voltage, produce an output voltage, and selectively operate in one of a boost mode, a skip mode, and a linear mode, wherein:
    in the boost and skip modes, the boost converter switches on and off the switching transistor at a switching frequency to produce an output voltage that is larger than the input voltage, with the boost mode engaged for input voltages smaller than a first predetermined limit and with the skip mode engaged for input voltages between the first predetermined limit and a larger second predetermined limit, and
    in the linear mode, engaged for input voltages greater than the second predetermined limit, the boost converter turns off the switching transistor at all times to pass the input voltage unboosted.

2. The voltage converter circuit of claim 1, wherein the boost converter includes a mode-selection-and-control circuit configured to receive a feedback voltage as a function of the output voltage, and selects operation in one of the boost, skip and linear modes as a function of a voltage difference between the feedback voltage and a feedback threshold voltage.

3. The voltage converter circuit of claim 2, wherein the feedback voltage differs from the output voltage by a diode voltage drop.

4. The voltage converter circuit of claim 1, further comprising an output terminal configured to deliver the output voltage to a first terminal of an LED, a feedback terminal configured to receive a feedback voltage from a second terminal of the LED, and a current source configured to draw a regulated current from the second terminal of the LED,
    wherein in the linear mode a voltage across the LED is limited by the regulated current drawn from the second terminal of the LED.

5. The voltage converter circuit of claim 1, wherein the boost converter includes a mode-selection-and-control circuit, the mode-selection circuit configured to receive a switching clock signal and a feedback voltage as a function of the output voltage, and generate and deliver, in the boost and skip modes, a pulse-width-modulated (PWM) control signal to a gate of the switching transistor to switch the switching transistor during at least some cycles of the switching clock, and in linear mode generate and deliver a non-PWM gate control signal to the gate of the switching transistor to turn off the switching transistor during all cycles of the switching clock signal.

6. The voltage converter circuit of claim 5, wherein the mode-selection-and-control circuit generates and delivers pulses of the PWM gate control signal to the gate of the switching transistor during each cycle of the switching clock signal, and in skip mode the mode-selection-and-control circuit generates and delivers pulses of the PWM gate control signal to the gate of the switching transistor during less than all cycles of the switching clock signal.

7. The voltage converter circuit of claim 5, wherein the mode-selection-and-control circuit includes a feedback amplifier configured to receive a feedback voltage, as a function of the output voltage, and a feedback threshold voltage, and generate a feedback comparison voltage as a function of the voltage difference between the feedback voltage and the feedback threshold voltage, the mode-selection-and-control circuit configured to selectively enter one of the boost, skip and linear modes as a function of the feedback comparison voltage.

8. The voltage converter circuit of claim 7, wherein the mode-selection and control circuit includes a skip comparator configured to receive the feedback comparison voltage and a skip threshold voltage, and generate a skip comparison voltage as a function of the voltage difference between the feedback comparison voltage and the skip threshold voltage, the mode-selection-and-control circuit configured to selectively enter the skip mode as a function of the skip comparison voltage.

9. The voltage converter circuit of claim 7, wherein the mode-selection and control circuit includes a boost comparator configured to receive the feedback comparison voltage and a sawtooth signal, and generate a boost comparison voltage as a function of the voltage difference between the feedback comparison voltage and the sawtooth signal, the mode-selection-and-control circuit configured to modulate the pulse width of the PWM gate control signal during the boost mode as a function of the boost comparison voltage.

10. A voltage converter circuit, comprising:
    a boost converter having a switching transistor and configured to receive an input voltage, produce an output voltage and selectively operate in one of a boost mode, a skip mode, and a linear mode, wherein:
    in the boost and skip modes, the boost converter switches on and off the switching transistor at a switching frequency to produce an output voltage of greater magnitude than input voltage magnitudes, and
    in the linear mode, the boost converter turns off the switching transistor at all times to pass the input voltage unboosted,
    wherein the boost converter includes a mode-selection-and-control circuit, the mode-selection circuit configured to receive a switching clock signal and a feedback voltage as a function of the output voltage, and generate and deliver, in the boost and skip modes, a pulse-width-modulated (PWM) control signal to a gate of the switching transistor to switch the switching transistor during at least some cycles of the switching clock, and in linear mode generate and deliver a non-PWM gate control signal to the gate of the switching transistor to turn off the switching transistor during all cycles of the switching clock signal,
    wherein the mode-selection-and-control circuit includes a feedback amplifier configured to receive a feedback voltage, as a function of the output voltage, and a feedback threshold voltage, and generate a feedback comparison voltage as a function of the voltage difference between the feedback voltage and the feedback threshold voltage, the mode-selection-and-control circuit configured to selectively enter one of the boost, skip and linear modes as a function of the feedback comparison voltage, and
    wherein the mode-selection and control circuit includes a multiple-input AND gate configured to receive a skip control voltage, a second switching clock signal, and a boost control voltage, and generate the PWM gate control signal and the non-PWM gate control signal as a function of the skip control signal, second switching clock signal, and boost control signal, wherein the skip control signal is a function of a voltage difference between the feedback comparison signal and a skip threshold voltage, and the boost control signal is a function of a voltage difference between the feedback comparison signal and a sawtooth signal.

11. The voltage converter circuit of claim 4, wherein the current source includes an amplifier, an output transistor and a resistor, the amplifier is configured to operate in a negative feedback configuration having a feedback path passing from a gate to a source of the output transistor and to generate a constant voltage across the resistor to produce the regulated current, and a drain of the output transistor is configured to deliver the regulated current.

12. The voltage converter circuit of claim 1, wherein the boost converter includes an inductor configured to receive the input voltage, a diode connected between the inductor and an output terminal, a capacitor connected to the diode and the output terminal, and a switching transistor having a drain connected to the inductor and the diode.

13. A voltage converter circuit, comprising:
a boost converter configured to receive an input voltage and produce an output voltage, and selectively operate in one of a boost mode, a skip mode, and a linear mode, the boost converter including a switching transistor, an inductor, a diode, and a capacitor,
wherein the boost converter operates as a switching regulator in the boost and skip modes to produce output voltage magnitudes greater than input voltage magnitudes, and in the linear mode does not operate as a switching regulator and instead allows the input voltage to pass unboosted,
wherein the boost converter operates in the boost mode for input voltage magnitudes less than a first predetermined input voltage magnitude, in the skip mode for input voltage magnitudes between the first predetermined magnitude and a second predetermined input voltage magnitude greater than the first predetermined input voltage magnitude, and in the linear mode for input voltage magnitudes greater than the second predetermined input voltage magnitude.

14. The voltage converter circuit of claim 13, wherein the boost converter includes a mode-selection-and-control circuit having an amplifier configured to receive a feedback voltage as a function of the output voltage and generate a feedback comparison signal as a function of a voltage difference between the feedback voltage and a feedback threshold voltage, and a plurality of comparators configured to receive the feedback comparison signal and generate control signals to select operation in one of the boost, skip and linear modes as a function of the feedback comparison signal and a plurality of threshold voltages.

15. The voltage converter circuit of claim 14, wherein the feedback voltage differs from the output voltage by a diode voltage drop.

16. The voltage converter circuit of claim 14, wherein the boost converter includes a switching transistor and the mode-selection circuit is configured to receive a switching clock signal and generate and deliver, in the boost and skip modes, a pulse-width-modulated (PWM) control signal to a gate of the switching transistor to switch the switching transistor during at least some cycles of the switching clock, and in linear mode generate and deliver a non-PWM gate control signal to the gate of the switching transistor to turn off the switching transistor during all cycles of the switching clock signal.

17. The voltage converter circuit of claim 14, wherein the mode-selection-and-control circuit generates and delivers pulses of the PWM gate control signal to the gate of the switching transistor during each cycle of the switching clock signal, and in skip mode the mode-selection-and-control circuit generates and delivers pulses of the PWM gate control signal to the gate of the switching transistor during less than all cycles of the switching clock signal.

18. A voltage converter circuit, comprising:
a boost converter coupled to an input voltage and having an output terminal for connection to a load device, the boost converter including a pair of energy storage devices with a diode connected between them and a discharge switch coupling an input terminal of the diode to ground,
a current sink coupled to the load device at an input terminal thereof, and
a mode controller having an input coupled to the input terminal of the current sink and an output coupled to an input of the discharge switch, and configured to operate the boost converter in boost and linear modes, wherein
in the boost mode, engaged for input voltages smaller than a predetermined limit, the mode controller generates a gate control signal to turn on and off the discharge switch at a switching frequency, to produce an output voltage that is larger than the input voltage, and
in the linear mode, engaged for input voltages greater than the predetermined limit, the mode controller generates a gate control signal to turn off the discharge switch at all times to pass the input voltage unboosted.

* * * * *